(12) United States Patent
Gadhiraju

(10) Patent No.: US 7,722,780 B2
(45) Date of Patent: May 25, 2010

(54) REFRIGERANT COMPOSITION AND PROCESS FOR PREPARATION THEREOF

(75) Inventor: Venkatarathnam Gadhiraju, Chennai (IN)

(73) Assignee: Indian Institute of Technology Madras, Chennai (IN)

( * ) Notice: Subject to any disclaimer, the term of this patent is extended or adjusted under 35 U.S.C. 154(b) by 30 days.

(21) Appl. No.: 10/557,189

(22) PCT Filed: May 19, 2004

(86) PCT No.: PCT/IB2004/001623

§ 371 (c)(1),
(2), (4) Date: Apr. 4, 2007

(87) PCT Pub. No.: WO2004/101703

PCT Pub. Date: Nov. 25, 2004

(65) Prior Publication Data

US 2007/0181848 A1    Aug. 9, 2007

(30) Foreign Application Priority Data

May 19, 2003    (IN)    ............... 415/MAS/2003

(51) Int. Cl.
*C09K 5/04*    (2006.01)

(52) U.S. Cl. ...................................................... 252/67
(58) Field of Classification Search .................... 252/67
See application file for complete search history.

(56) References Cited

U.S. PATENT DOCUMENTS

| 5,441,658 | A | * | 8/1995 | Boyarsky et al. | ............... 252/67 |
| 5,706,663 | A | * | 1/1998 | Boiarski et al. | ............... 62/114 |
| 7,059,144 | B2 | * | 6/2006 | Flynn et al. | ................ 62/196.4 |

FOREIGN PATENT DOCUMENTS

| GB | 1336892 | * 11/1973 |
| SU | 627154 | * 8/1978 |

* cited by examiner

*Primary Examiner*—John R Hardee
(74) *Attorney, Agent, or Firm*—Edwards Angell Palmer & Dodge LLP; Jeffrey D. Hsi

(57) ABSTRACT

The present application provides a refrigerant composition for a single stage refrigeration system operation comprising: more than 25 molar percent but less than 30 molar percent of Nitrogen; at least some but less than 20 molar percent of Methane; more than 30 molar percent but less than 70 molar percent of Propane, Argon, Helium, Neon and combinations thereof, and optionally up to 45 molar percent of Ethane, Ethylene and combinations thereof and a process for preparing the said composition.

Figure 1:
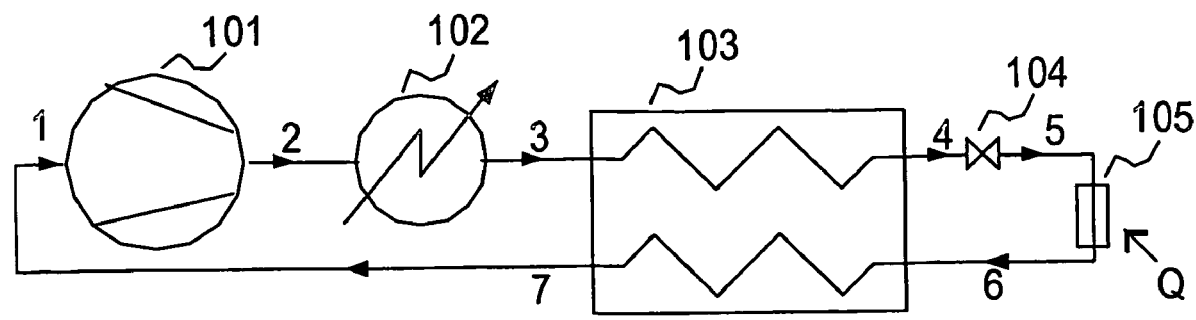

8 Claims, 1 Drawing Sheet

REFRIGERANT COMPOSITION AND PROCESS FOR PREPARATION THEREOF

FIELD OF THE INVENTION

The present application relates to a refrigerant composition for use in a single stage refrigeration system. The present application also relates to a process for preparing the refrigerant composition.

BACKGROUND OF THE INVENTION

Simple refrigeration systems use a method called vapor compression cycle. The vapor compression cycle is a method in which a compressor such as a piston compressor compresses a low-pressure refrigerant vapor. In a next stage, a condenser condenses the warm compressed vapor, resulting in a partial or complete condensation of the vapor. This condensed refrigerant then passes through a fine capillary tube or other constriction into a larger chamber at low pressure. As the refrigerant enters the larger chamber, it evaporates and absorbs heat, resulting in the vapor. This refrigerant vapor is then routed to the intake of the compressor, thus closing the cycle. This is the so-called closed loop refrigeration system.

A single stage refrigerant system is used to achieve temperatures up to −40° C. For temperatures in the range −50° C. to −80° C. a two-stage cascaded vapor compression system has been proposed. This method uses a single refrigerant per stage and two compressors, one for each stage. For still lower refrigeration temperatures, more cascaded stages are required. Typically, four stage cascade vapor compression systems are proposed for reaching cryogenic temperatures, lower than −150 C.

An advance in technology has been achieved by using a single stage compression system with a mixture of refrigerants. This method has been used to achieve temperatures far below those that can be achieved using a cascaded multi-stage system, for example, the range −100° C. to −210° C. This method uses a mixture of several refrigerants each of which with different boiling points.

In mixed gas refrigeration systems, the refrigerant in gaseous form is compressed in a compressor and thereafter cooled to remove the heat of compression to near-ambient temperatures. Partial condensation of the refrigerant may occur in some cases. The refrigerant is then passed through the high pressure side of a heat exchanger, which is arranged in a cryostat. The high pressure refrigerant leaving the heat exchanger is throttled to a lower pressure in a throttling device such as an orifice or a capillary tube. The refrigerant is then passed through an evaporator where it absorbs heat from the substance (solid or fluid) being cooled.

Researchers have proposed several refrigerant compositions. There is still a need for a refrigerant composition that can achieve better efficiency or a greater cooling effect or both.

Soviet Union patent 627,154 has suggested the composition of the refrigerant as follows:
Nitrogen: 25-40 molar percent
Methane: 20-25 molar percent
Ethane: 15-35 molar percent
Propane: 25-45 molar percent UK patent 1,336,892 has suggested the composition of the refrigerant as follows:
Nitrogen: 20-70 molar percent
Methane: 10-30 molar percent
Ethane: 10-25 molar percent
Propane: 10-25 molar percent U.S. Pat. No. 5,441,658 has suggested the composition of the refrigerant as follows:
Nitrogen: 30-50 molar percent
Methane: less than 20 molar percent
Propane: greater than 30 molar percent
Ethane: balance This specification describes the optimum refrigerant composition to be used in a single stage refrigeration cycle.

OBJECTS OF THE PRESENT INVETION

The main object of the present invention is to provide a mixed refrigerant composition for use in a single stage refrigeration system.

Another object of the present invention is to provide a method for preparing the aforesaid mixed refrigerant composition.

SUMMARY OF THE PRESENT INVENTION

The present application provides a refrigerant composition for a single stage refrigeration system operation comprising: more than 25 molar percent but less than 30 molar percent of Nitrogen; at least some but less than 20 molar percent of Methane; more than 30 molar percent but less than 70 molar percent of Propane, Argon, Helium, Neon and combinations thereof, and optionally up to 45 molar percent of Ethane, Ethylene and combinations thereof and a process for preparing the said composition.

DETAILED DESCRIPTION OF THE PRESENT INVENTION

A refrigerant composition for a single stage refrigeration system operation comprising:
more than 25 molar percent but less than 30 molar percent of nitrogen;
at least some but less than 20 molar percent of methane;
more than 30 molar percent but less than 70 molar percent of propane, argon, helium, neon and combinations thereof, and
optionally up to 45 molar percent of ethane, ethylene and combinations thereof.

In an embodiment of the present application, the molar percent of methane in the composition is more than 5 percent but less than 20 percent.

In another embodiment of the present application, the molar percent of propane in the composition is more than 30 percent but less than 50 percent.

In yet another embodiment of the present application, the molar percent of ethane in the composition is in the range of 5 to 40 percent.

In still another embodiment of the present application, the molar percent of a combination of propane and neon in the composition is in the range of 30 to 60 percent.

In one more embodiment of the present application, the molar percent of a combination of propane and argon in the composition is in the range of 30 to 60 percent.

In one another embodiment of the present application, the molar percent of a combination of propane and helium in the composition is in the range of 30 to 60 percent.

More preferably, the present application provides a refrigerant composition for a single stage refrigeration system operation comprising:
more than 25 molar percent but less than 30 molar percent of nitrogen;
more than 5 but less than 20 molar percent of methane;

more than 30 molar percent but less than 50 molar percent of propane, and
optionally up to 45 molar percent of ethane, ethylene and combinations thereof.

The present application also provides a process for preparing a refrigerant composition for a single stage refrigeration system operation, said method comprising mixing more than 25 molar percent but less than 30 molar percent of nitrogen; at least some but less than 20 molar percent of methane; more than 30 molar percent but less than 70 molar percent of propane, argon, helium, neon and combinations thereof, and optionally up to 45 molar percent of ethane, ethylene and combinations thereof.

In an embodiment of the present application, the molar percent of methane in the composition is more than 5 percent but less than 20 percent.

In another embodiment of the present application, the molar percent of propane in the composition is more than 30 percent but less than 50 percent.

In yet another embodiment of the present application, the molar percent of ethane in the composition is in the range of 5 to 40 percent.

In still another embodiment of the present application, the molar percent of a combination of propane and neon in the composition is in the range of 30 to 60 percent.

In one more embodiment of the present application, the molar percent of a combination of propane and argon in the composition is in the range of 30 to 60 percent.

In one another embodiment of the present application, the molar percent of a combination of propane and helium in the composition is in the range of 30 to 60 percent.

Please note that the lower limits of ingredients such as methane, ethane and ethylene are not very critical. A person skilled in the art would be able to arrive at the lower limits of these ingredients based upon the refrigeration temperature desired, the economics and other parameters.

Further, the present application provides a method of preparing a refrigerant composition for a single stage refrigeration system operation, said method comprising the step of mixing more than 25 molar percent but less than 30 molar percent of nitrogen; more than 5 but less than 20 molar percent of methane; more than 30 molar percent but less than 50 molar percent of propane, and optionally up to 45 molar percent of ethane, ethylene and combinations thereof.

A method of refrigerating a substance, in a single stage, by preparing a refrigerant composition, compressing the said refrigerant, cooling the said compressed composition, throttling the said cooled refrigerant, and passing the same, thereafter, through an evaporator for cooling the substance.

This disclosure is directed toward a composition of refrigerants for use in single stage refrigeration systems to achieve cryogenic temperature ranges. Applications for such composition of refrigerants include household or commercial refrigeration systems such as refrigerators, electronic circuit cooling, medical applications, cryo-vacuum pumps, storing of biological specimens and tissues at low temperatures, cooling of Gamma-ray, Infra Red and X-ray detectors, cryosurgery and the like.

In one aspect disclosed herein is a composition of gas cryogenic refrigerant for use in systems at refrigeration temperatures from −173° C. to −210° C. consisting of more than 25 molar percent but less than 30 molar percent of nitrogen, less than 20 molar percent of methane, up to 45 molar percent of either or both of ethane and ethylene, and more than 30 molar percent but less than 70 molar percent of at least one or a combination of propane, argon, helium, and neon.

In a further aspect, Ethane or Ethylene need not be used in the composition.

BRIEF DESCRIPTION OF THE ACCOMPANYING DRAWING

FIG. 1 represents the schematic of a single stage refrigeration system operation with refrigerant mixtures.

The present application is further described in detail with reference to the following examples, which are given purely by way of illustration and hence, the same should not be construed to limit the scope of the present application in any manner.

The volume flow rate handled by a compressor will be lower than the displacement volume of a compressor because of the re-expansion losses in the compressor. The actual refrigeration produced per litre of compressor displacement is given by $Q*\lambda_{vol}$, where Q is the refrigeration produced in Joules per litre of refrigerant and $\lambda_{vol}$ is the compressor volumetric efficiency. The examples have been optimized assuming that the volumetric efficiency of the compressor used is dependent on operating pressures in the system as $\lambda_{vol}=0.89-0.04*ph/pl$, where ph is the high pressure and pl is the low pressure in the system. It has also been assumed that there is no pressure drop in the heat exchanger and connecting piping.

EXAMPLE 1

The new refrigerant compositions proposed herein will result in an efficient cooling system. For example, at an ambient temperature of 27 C (300 K), refrigerating temperature of −183 C (90 K), with operating pressures (high/low) of 20 bar/3 bar, and ensuring that the minimum temperature difference between the hot and the cold streams in the heat exchanger being set to 5 C in the heat exchanger, and an isothermal compressor, the composition shown in Table 1 will result in Exergy efficiency ($\lambda_{ex}$) of 28%; Refrigeration of 65 Joules per litre of low pressure refrigerant entering the compressor, volumetric efficiency ($\lambda_{vol}$) of 0.621 (0.89-0.04*20/3) and a net available refrigeration of 40.4 J/l of compressor displacement volume (65*0.621).

To illustrate the usefulness of this data, let us consider a compressor whose displacement rate is 28 litres/minute. The net refrigeration that can be obtained with the mixture given in Table-1 at the operating conditions stated, and the given compressor would be 40.4*28/60=18.85 Watts.

TABLE 1

| Nitrogen | 28.5 molar percent |
|---|---|
| Methane | 18.5 molar percent |
| Ethane | 18.0 molar percent |
| Propane | 35.0 molar percent |

EXAMPLE 2

Table 2 shows an example of a refrigerant composition at an ambient temperature of 27 C (300 K), refrigerating temperature of −191 C (82 K), with operating pressures (high/low) of 20 bar/3.2 bar, and ensuring that the minimum temperature difference between the hot and the cold streams in the heat exchanger being set to 5 C in the heat exchanger, and an isothermal compressor, the composition shown in Table 2 will result in Exergy efficiency ($\lambda_{ex}$) of 15.8%; Refrigeration of 34 Joules per litre of low pressure refrigerant entering the compressor, volumetric efficiency ($\lambda_{vol}$) of 0.64 (0.89-

0.04*20/3.2) and a net available refrigeration of 21.8 J/l of compressor displacement volume (34*0.64).

TABLE 2

| | |
|---|---|
| Nitrogen | 27.7 molar percent |
| Methane | 19.9 molar percent |
| Propane | 34.9 molar percent |
| Neon | 17.5 molar percent |

As shown in Table 2, under some conditions, ethane/ethylene may be completely excluded from the refrigerant composition.

EXAMPLE 3

Table 3 shows an example of a refrigerant composition at an ambient temperature of 27° C. (300 K), refrigerating temperature of −169° C. (104 K), with operating pressures (high/low) of 20 bar/5 bar, and ensuring that the minimum temperature difference between the hot and the cold streams in the heat exchanger being set to 5° C. in the heat exchanger, and an isothermal compressor, the composition shown in Table 3 will result in Exergy efficiency ($\lambda_{ex}$) of 26.3%; Refrigeration of 93 Joules per litre of low pressure refrigerant entering the compressor, volumetric efficiency ($\lambda_{vol}$) of 0.73 (0.89−0.04*20/5) and a net available refrigeration of 68 J/l of compressor displacement volume (93*0.73).

TABLE 3

| | |
|---|---|
| Nitrogen | 21.8 molar percent |
| Methane | 18.2 molar percent |
| Ethane | 17.6 molar percent |
| Propane | 35.0 molar percent |
| Argon | 7.4 molar percent |

EXAMPLE 4

Table 4 shows an example of a refrigerant composition at an ambient temperature of 27° C. (300 K), refrigerating temperature of −188° C. (85 K), with operating pressures (high/low) of 20 bar/3.1 bar, and ensuring that the minimum temperature difference between the hot and the cold streams in the heat exchanger being set to 5° C. in the heat exchanger, and an isothermal compressor, the composition shown in Table 4 will result in Exergy efficiency ($\lambda_{ex}$) of 18.6%; Refrigeration of 41.7 Joules per litre of low pressure refrigerant entering the compressor, volumetric efficiency ($\lambda_{vol}$) of 0.63 (0.89−0.04*20/3.1) and a net available refrigeration of 26.4 J/l of compressor displacement volume (41.7*0.63).

TABLE 4

| | |
|---|---|
| Nitrogen | 29.0 molar percent |
| Methane | 19.9 molar percent |
| Ethane | 8.9 molar percent |
| Propane | 31.3 molar percent |
| Helium | 10.9 molar percent |

EXAMPLE 5

Table 5 shows an example of a refrigerant composition at an ambient temperature of 27° C. (300 K), refrigerating temperature of −188° C. (85 K), with operating pressures (high/low) of 20 bar/1.88 bar, and ensuring that the minimum temperature difference between the hot and the cold streams in the heat exchanger being set to 5° C. in the heat exchanger, and an isothermal compressor, the composition shown in Table 5 will result in Exergy efficiency ($\lambda_{ex}$) of 28.4%; Refrigeration of 48 Joules per litre of low pressure refrigerant entering the compressor, volumetric efficiency ($\lambda_{vol}$) of 0.464 (0.89−0.04*20/3.5) and a net available refrigeration of 22 J/l of compressor displacement volume (48*0.464).

TABLE 5

| | |
|---|---|
| Nitrogen | 26.9 molar percent |
| Methane | 16.9 molar percent |
| Ethylene | 16.2 molar percent |
| Propane | 40.0 molar percent |

The above examples illustrate optimum mixtures for a refrigerator that is designed to operate at a certain specified temperature. In many practical situations a refrigerator may be required to operate at other lower or higher temperatures. Appropriate changes need to be made to the compositions designed for providing refrigeration at a single temperature to provide refrigeration optimally over different temperatures, as required. For example, a small amount of helium or neon may be added to a nitrogen-argon-methane-ethane-propane mixture to decrease the lowest operating temperature. In some cases, the addition of new fluids can reduce the efficiency even at the design temperature (for example 104 K in example-3, table 3). The loss of efficiency even at a design temperature, however, is acceptable because of the demands imposed by the application for operation at a range of temperatures. Those practising the art of mixed refrigerant technology normally know how to choose the refrigerant mixture components and their compositions from those claimed in this specification, to suit their special needs. Sometimes it is prudent to increase the refrigeration available at the cost of efficiency. Normally those practising the art know how to choose a composition that satisfies this requirement. The examples provided are only for illustrative purposes and are not intended to be limiting the claims made.

The compositions to be used will vary with operating/design conditions and hardware such as the compressor to be used etc. It should be understood that the use of a refrigerant composition that falls within the claims in this specification is not to be taken in isolation, but in conjunction with other parameters such as those indicated below to achieve a high efficiency and high refrigeration. Only an appropriate composition can result in optimum performance. The efficiency and the quantity of refrigeration obtained from different systems depend not only on the type of refrigerant composition employed, but also on the hardware used as well as operating parameters such as the operating pressures used etc. as well as the type of lubricating oil used, type of oil separation/filtration systems used, compressor used, the quantity of refrigeration in the system etc. The optimum composition for one system may not be optimum for other systems, operating temperatures and pressures. The components used in the refrigerant composition also depend on other factors as well. For example, some refrigerant components may freeze at low temperatures. The complete refrigerant may also freeze at a certain temperature. With an appropriate hardware and operating conditions, the refrigerant compositions claimed in this specification will result in high exergy efficiency and/or high refrigeration. The methods to decide on the type of system to be employed, type of hardware and operating conditions and the components to be used in a composition, are generally known to those practicing the art of mixed refrigerant technology.

The working of the refrigerant mixture in a single stage refrigeration system is further described in detail in the following paragraph with reference to FIG. 1 which shows the schematic of a single stage refrigeration system operating with refrigerant mixtures.

The low pressure refrigerant entering the compressor through line 1 at near ambient temperature and low pressure, typically 1 to 5 bar is compressed to a high pressure, typically 12 to 25 bar, in a compressor 101. The compression process also increases the temperature of the refrigerant. The compressed refrigerant leaving the compressor through line 2 is cooled to near ambient temperature in an after cooler, 102. In this specification, no condensation of the refrigerant is expected in the after cooler 102. The high pressure, and near ambient temperature refrigerant leaves the after cooler 102 and enters a two stream heat exchanger 103, where it cools and condenses. The cold high pressure refrigerant leaving the heat exchanger is expanded to a lower pressure in an expansion device 104 such as a capillary tube, orifice etc. The low pressure low temperature refrigerant leaving the expansion device 104 is warmed up in evaporator 105 to provide the required refrigeration. The low pressure stream is then warmed up to near ambient temperature in the heat exchanger 103 and enters the compressor 101 through line 1.

The Inventors would like to submit here that the composition of the present application is a synergistic composition exhibiting surprising and unexpected properties. This is clear from table 6, which establish the synergistic effect of all the compositions, developed in the above five examples.

TABLE 6

| Ingredient | High pressure, ph (bar) | Low pressure, pl (bar) | Refrigerating Temperature achieved (K) | Exergy Efficiency (%) | Refrigeration Q (J/l) | Volumetric efficiency $\eta_{vol}$** | Refrigeration produced $Q*\eta_{vol}$ (J/l) |
|---|---|---|---|---|---|---|---|
| Nitrogen | 20 | 1 | 77.2 | 1.54 | 4.612 | 0.09 | 7.1 |
| Methane | 20 | 1 | 111.5 | 4.03 | 11.92 | 0.09 | 1.1 |
| Ethane | 20 | 1 | 184.3 | 17.87 | 50.76 | 0.09 | 4.6 |
| Ethylene | 20 | 1 | 169.2 | 12.63 | 36.36 | 0.09 | 3.3 |
| Propane | 9 | 1 | 230.8 | 23.18 | 47.72 | 0.53 | 25.3 |
| Argon | 20 | 1 | 87.2 | 2.00 | 5.7 | 0.09 | 0.5 |
| Helium* | 20 | 1 | 4.2 | 0 | 0 | — | — |
| Neon* | 20 | 1 | 26 | 0 | 0 | — | — |
| Composition of Example 1 | 20 | 3 | 90 | 28 | 65 | 0.621 | 40.4 |
| Composition of Example 2 | 20 | 3.2 | 82 | 15.8 | 34 | 0.64 | 21.8 |
| Composition of Example 3 | 20 | 5 | 104 | 26.3 | 93 | 0.73 | 68 |
| Composition of Example 4 | 20 | 3.1 | 85 | 18.6 | 41.7 | 0.63 | 26.4 |
| Composition of Example 5 | 20 | 1.88 | 85 | 28.4 | 48 | 0.464 | 22 |
| Composition 1 of prior art | 20 | 2.9 | 90 | 23.8 | 54.9 | 0.61 | 33.6 |
| Composition 2 of prior art | 20 | 2.02 | 85 | 20.3 | 36.1 | 0.495 | 17.9 |

*The system does not function when helium or neon alone is used
$\eta_{vol}$** Volumetric efficiency of a compressor dependent on the high and low pressures as follows:
$\eta_{vol} = 0.89 - 0.04*ph/pl$ The already known composition 1 has been taken from U.S. Pat. No. 5,441,658 and contains Nitrogen: 30 mol %, Methane: 15 mol %, Ethane: 25 mol %, Propane: 30 mol %. The already known composition 2 has been taken from U.S. Pat. No. 5,441,658 and contains Nitrogen: 35 mol %, Methane: 10 mol %, Ethane: 25 mol %, Propane: 30 mol %.

Comparison of our results with the composition of U.S. Pat. No. 5,441,658 is given in table 7 herebelow.

TABLE 7

| Ingredient | High pressure, ph (bar) | Low pressure, pl (bar) | Refrigerating Temperature achieved (K) | Exergy Efficiency (%) | Refrigeration Q (J/l) | Volumetric efficiency $\eta_{vol}$** | Refrigeration produced $Q*\eta_{vol}$ (J/l) |
|---|---|---|---|---|---|---|---|
| Composition of Example 4 | 20 | 3.1 | 85 | 18.6 | 41.7 | 0.63 | 26.4 |

TABLE 7-continued

| Ingredient | High pressure, ph (bar) | Low pressure, pl (bar) | Refrigerating Temperature achieved (K) | Exergy Efficiency (%) | Refrigeration Q (J/l) | Volumetric efficiency $\eta_{vol}$** | Refrigeration produced $Q*\eta_{vol}$ (J/l) |
|---|---|---|---|---|---|---|---|
| Composition of Example 5 | 20 | 1.88 | 85 | 28.4 | 48 | 0.464 | 22 |
| Composition 1 of prior art | 20 | 1.97 | 85 | 25.7 | 44.9 | 0.484 | 21.8 |
| Composition 2 of prior art | 20 | 2.02 | 85 | 20.3 | 36.1 | 0.495 | 17.9 |

As indicated above, the already known composition 1 has been taken from U.S. Pat. No. 5,441,658 which contains nitrogen: 30 mol %, methane: 15 mol %, ethane: 25 mol %, propane: 30 mol % and the already known composition 2 has been taken from U.S. Pat. No. 5,441,658 which contains nitrogen: 35 mol %, methane: 10 mol %, ethane: 25 mol %, propane: 30 mol %. In the above table, the performance of the refrigeration system to provide refrigeration at 85 K using the present invention and prior art are compared. A certain low pressure is required to produce provide refrigeration at a certain temperature. This pressure is dependent on the composition. Hence the operating pressures are different in the different cases. The exergy efficiency as well as the amount of refrigeration produced with example 5 of present invention is much higher than that from prior art. On the other hand, the refrigeration available using the present invention example 4 is higher than those in prior art, but the exergy efficiency is somewhat lower. Comparison of the results of the composition of the present invention with the composition defined in the prior art document is further shown in table 8 given herebelow.

TABLE 8

| Ingredient | High pressure, ph (bar) | Low pressure, pl (bar) | Refrigerating Temperature achieved (K) | Exergy Efficiency (%) | Refrigeration Q (J/l) | Volumetric efficiency $\eta_{vol}$** | Refrigeration produced $Q*\eta_{vol}$ (J/l) |
|---|---|---|---|---|---|---|---|
| Composition of Example 1 | 20 | 3 | 90 | 28 | 65 | 0.621 | 40.4 |
| Composition 1 of prior art | 20 | 2.9 | 90 | 23.8 | 54.9 | 0.61 | 33.6 |

In the above table, the performance of the refrigeration system to provide refrigeration at 90 K using the present invention and prior art are compared. The exergy efficiency as well as the amount of refrigeration produced with example 1 of present invention is much higher than those from prior art.

The compositions of the present application are a synergistic ones and have been arrived at after much experimentation. It should not be considered that the compositions of the present invention have been arrived at by merely working on the already known compositions. In fact, the Inventors of the present application have worked against the teachings of the prior art documents to arrive at the present invention.

The invention claimed is:

1. A method of refrigerating a substance, comprising the steps of:
compressing a refrigerant composition in a single stage system, to obtain a compressed composition,
cooling the said compressed composition to obtain a cooled refrigerant;
throttling the said cooled refrigerant, and
passing the same, thereafter, through an evaporator for cooling the substance, characterized in that the said composition comprises: more than 25 molar percent but less than 30 molar percent of Nitrogen; at least some but less than 20 molar percent of Methane; more than 30 molar percent but less than 70 molar percent of a gas selected from Propane, Argon, Helium, Neon and combinations thereof wherein more than 30 molar percent of propane is always present and optionally up to 45 molar percent of Ethane, Ethylene and combinations thereof wherein if such Ethane/Ethylene combination is present, the molar percent of ethane is in the range of 5 to 40 percent.

2. The method as claimed in claim 1, wherein the molar percent of methane in the composition is more than 5 percent but less than 20 percent.

3. The method as claimed in claim 1, wherein the molar percent of Propane in the composition is more than 30 percent but less than 50 percent.

4. The method as claimed in claim 1, wherein the molar percent of Ethane in the composition is 5 to 40 percent.

5. The method as claimed in claim 1, wherein the molar percent of a combination of Propane and Neon in the composition is up to 60 percent.

6. The method as claimed in claim 1, wherein the molar percent of a combination of Propane and Argon in the composition is up to 60 percent.

7. The method as claimed in claim 1, wherein the molar percent of a combination of Propane and Helium in the composition is up to 60 percent.

8. A method of refrigerating a substance, comprising the steps of:
   compressing a refrigerant composition in a single stage system, to obtain a compressed composition,
   cooling the said compressed composition to obtain a cooled refrigerant;
   throttling the said cooled refrigerant, and passing the same, thereafter, through an evaporator for cooling the substance,
   characterized in that the said composition comprises:
   more than 25 molar percent but less than 30 molar percent of Nitrogen;
   at least some but less than 20 molar percent of Methane;
   more than 30 molar percent but less than 70 molar percent of a gas selected from Propane, Argon, Helium, Neon and combinations thereof, wherein more than 30 molar percent of propane is always present; and
   optionally up to 45 molar percent of Ethane, Ethylene and combinations thereof is present, wherein if such Ethane/Ethylene combination is present, the molar percent of ethane is in the range of 5 to 40 percent.

* * * * *

UNITED STATES PATENT AND TRADEMARK OFFICE
CERTIFICATE OF CORRECTION

| | | |
|---|---|---|
| PATENT NO. | : 7,722,780 B2 | Page 1 of 1 |
| APPLICATION NO. | : 10/557189 | |
| DATED | : May 25, 2010 | |
| INVENTOR(S) | : Venkatarathnam Gadhiraju | |

It is certified that error appears in the above-identified patent and that said Letters Patent is hereby corrected as shown below:

On the cover page, Item (75) please correct the spelling of the Inventor's place of residence as follows:
      Chennai (IN)

Signed and Sealed this

Twenty-sixth Day of October, 2010

David J. Kappos
*Director of the United States Patent and Trademark Office*